July 24, 1951     A. B. JACOBSEN     2,561,475
CIRCUIT FOR GENERATING SLOPING
AND RECTANGULAR GATES
Filed Nov. 26, 1945

INVENTOR
ANDREW B. JACOBSEN

BY     ATTORNEY

Patented July 24, 1951

2,561,475

UNITED STATES PATENT OFFICE 2,561,475

CIRCUIT FOR GENERATING SLOPING AND RECTANGULAR GATES

Andrew B. Jacobsen, Somerville, Mass., assignor, by mesne assignments, to the United States of America as represented by the Secretary of the Navy Application November 26, 1945, Serial No. 630,944

8 Claims. (Cl. 250—36)

This invention relates to methods and apparatus for generating sloping and rectangular gates, and more particularly, to methods and apparatus for generating such gates whose time of occurrence can be controlled by a suitable external voltage.

In a radar system for automatic tracking in range and azimuth (or elevation) while the antenna performs a continuous 360° azimuth scan, it is necessary to employ condenser storage or "memory devices." These "memory devices" are charged only during the time the radar beam illuminates the desired target, and for the remainder of the azimuth scan they supply voltages proportional to the target position and movement. In order that these "memory devices" may be charged at the proper time, the input to these devices must be "gated," that is, no energy is supplied to these devices except when the azimuth of the radar antenna is such that the desired target is illuminated. It is also necessary that the input to the "memory devices" be capable of self-correction.

In a known type of such a system, this self-correction is made possible by using two sloping gates which have equal amplitudes at a point corresponding to the target azimuth. The input to the "memory device" in this system is gated in azimuth by a rectangular gate which is centered about a point corresponding to the target azimuth. In this known system, as the antenna rotates in azimuth, it generates, by linkage to a rheostat or other means, a linear sawtooth which is repeated once per revolution. This is a convenient source of basic sawtooth waveforms for the generation of the necessary gates, but if this voltage alone were used, the gates would always appear at the same azimuth position. In any automatic tracking system, however, it must be possible to position the gates at the azimuth position of any desired target. To do this is one object of my invention.

A more specific object of my invention is to provide an apparatus for generating a pair of sloping gates, one of the pair increasing in amplitude as the other decreases, and a rectangular gate timed and controlled by the pair of sloping gates.

It is a further object of my invention to provide an apparatus for generating such gates from a basic sawtooth voltage, which gates are to be variable in position or time of occurrence relative to the basic sawtooth voltage, under control of an external means.

Other objects and advantages of this invention will be apparent from the following description, accompanied by a drawing in which.

Figure 1:
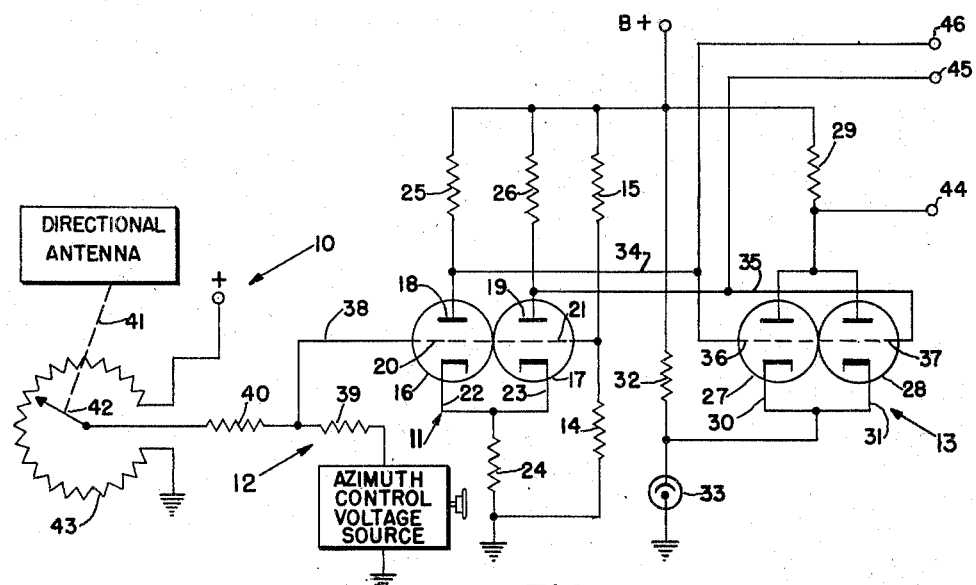
Fig. 1 is a circuit diagram of an embodiment of my invention.

The embodiment of my invention shown in Fig. 1 is particularly adaptable to generating azimuth gates for a radar system employing automatic range and azimuth (or elevation) tracking. This comprises a source, generally designated 10, of a series of linear sawtooth voltage waveforms, means 11 for producing a pair of sloping gates, one increasing in amplitude as the other decreases, means 12 for controlling the time, or position relative to the sawtooth voltage waveform, when the amplitude of one of the pair of sloping gates is equal to the other of the pair of sloping gates, and means 13 for producing, from the pair of sloping gates, a rectangular gate centered around the point of equal amplitudes of the pair of sloping gates.

The duration of the rectangular pulse is controlled by a portion of the means 11, specifically, the resistors 14 and 15 and the grid 21 of the tube 17.

Means 11 for producing a pair of sloping gates comprises a cathode coupled push-pull amplifier employing a pair of grid-controlled high-vacuum tubes 16 and 17. Their cathodes 22 and 23 are connected through a common resistor 24 to ground. The anodes 18 and 19 of tubes 16 and 17 are connected to a positive D. C. voltage through load resistors 25 and 26, respectively.

The rectangular gate producing means 13 comprises a pair of switch tubes 27 and 28 having a common load resistor 29, and cathodes 30 and 31 connected together to a biasing means 32 and 33. Resistor 32 is connected on one side to a positive D. C. voltage and on the other side to a voltage regulator tube 33. The other side of tube 33 is connected to ground.

Leads 34 and 35 couple the output of tubes 16 and 17 to control grids 36 and 37 of tubes 27 and 28. Lead 38 couples grid 20 of tube 16 to the source 12 of azimuth control voltage through a resistor 39, and to the source 10 of the linear sawtooth voltage through a resistor 40. Resistors 39 and 40 are used to properly relatively proportion the two voltages supplied to the grid 20 of tube 16.

The source 10 of linear sawtooth voltage consists of a directional antenna mechanically coupled, as indicated by dotted line 41, to a rotatable arm 42 of an azimuth potentiometer 43. As the antenna rotates in azimuth, it generates, by linkage 41 and arm 42 of potentiometer 43, a linear sawtooth voltage waveform repeated once per revolution. This series of voltage waveforms is represented by curve $a$ in Fig. 2.

Due to the circuit constants used, tubes 16 and 17 do not go below cutoff at any time during normal operation of the apparatus. In the initial condition the potential of anodes 18 and 19 is such that tube 27 is conducting heavily and tube 28 is not conducting.

Figure 2:
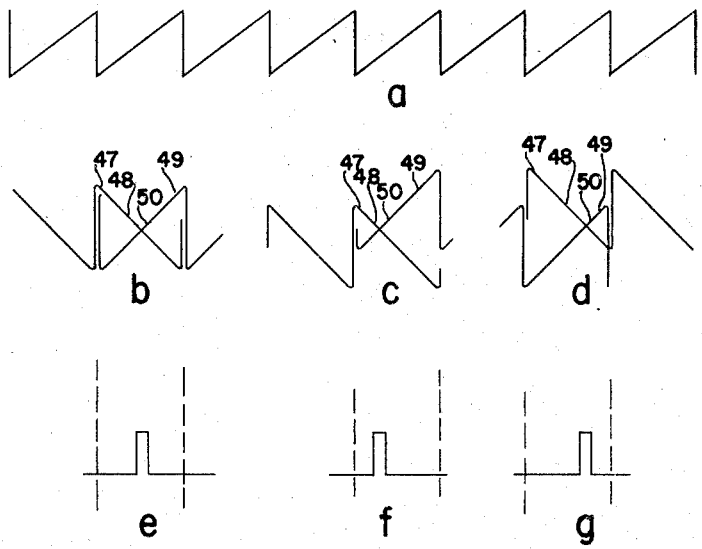
Fig. 2 shows representative voltage waveforms at the input and output of my invention.

As the sawtooth voltage input to grid 20 of tube 16 increases, the potential at anode 18 decreases (see curve 47 in Fig. 2b). When it reaches point 48 (see Fig. 2b), which corresponds to the cutoff grid potential of tube 27, current through resistor 29 quickly falls to zero, and terminal 44 rises sharply in potential, producing the leading edge of the rectangular gate shown at e in Fig. 2.

As the sawtooth voltage input continues to rise and more current is drawn through tube 16, the potential of its cathode 22 rises and hence the bias on tube 17 increases. This is the usual cathode coupled push-pull effect, and current is decreased in tube 17. This causes the potential of its anode 19 to rise, as shown by curve 49 in Fig. 2b.

When anode 19, connected to grid 37 of tube 28 reaches point 50 (Fig. 2b), which corresponds to the cutoff grid potential of tube 28, tube 28 begins conduction, causing the potential at point 44 to drop sharply, thereby producing the trailing edge of the rectangular gate (see e in Fig. 2).

When the sawtooth input drops, the initial conditions are re-established. As is apparent to a person skilled in the art, by raising the D. C. level of grid 21 of tube 17 the rectangular gate width can be increased, and by lowering it the gate width can be decreased.

From the above description, it is apparent that the anode voltages of tubes 16 and 17 generate the sloping gate voltages, while the anode voltage of tubes 27 and 28 generates the rectangular gate.

It will be understood that the D. C. level of grid 20 of tube 16 will control the time or position of occurrence of equal amplitudes of the sloping gates and hence, the time of the rectangular gate, relative to the sawtooth voltage input. These gates can therefore be made to occur at any position of the antenna.

For example, assume the azimuth control voltage is increased in magnitude, the potential of anode 18 of tube 16 will reach point 48 sooner (see Fig. 2c) than it would if the control voltage were less, and, therefore, the rectangular gate occurs nearer the minimum voltage point of the sawtooth voltage (see Fig. 2f). In like manner, when the azimuth control voltage is decreased in magnitude the gates are as represented in Fig. 2d and Fig. 2g. Therefore, by controlling the D. C. level of grid 20 of tube 16 the point of equal amplitudes of the pair of sloping gates and the rectangular gate can be located at any point relative to the sawtooth voltage, and, therefore, to the antenna azimuth.

Curve 47 in Figs. 2b, c and d represents the voltage waveform at terminal 46 of Fig. 1, and curve 49 in Figs. 2b, c and d represents the voltage waveform at terminal 45 of Fig. 1. The outputs available at these two terminals may be used in combination with other circuits of an automatic range and azimuth tracking radar system to produce an error signal for azimuth tracking, thereby providing means of self-correction in such a system. These sloping gates may be used for other purposes, for example, sweep voltage on special purpose cathode ray tubes.

The rectangular gate (see Figs. 2e, f and g) is available at terminal 44 of Fig. 1. The output available at this terminal may be used in an automatic range and azimuth tracking radar system to gate the input to a "memory device" of such a system. This gate may also be used for many other purposes, for example, a variable pedestal for supplying video energy to a cathode ray indicator.

This invention is limited only by the appended claims.

What is claimed is:

1. An apparatus for generating sloping and rectangular gates, comprising a source of a series of linear sawtooth voltage waveforms, a control voltage source, a cathode coupled push-pull amplifier employing a pair of grid controlled high vacuum tubes, a pair of switch tubes employing a common load resistor, the control grid of one of said pair of amplifier tubes being coupled to said sawtooth voltage source and to said control voltage source, means connecting the control grid of the other of said pair of amplifier tubes to a first point of fixed bias potential, means for coupling the control grids of said pair of switch tubes to the output of said amplifier tubes, and means connecting the cathode of each of said switch tubes to a second point of fixed bias potential, whereby as said sawtooth voltage and said control voltage are applied to said control grid of the first of said pair of amplifier tubes, there is produced at the output of said amplifier tubes a pair of sloping gates, one increasing in amplitude as the other decreases, said control voltage determining the point, relative to said sawtooth voltage, of equal amplitude of said pair of sloping gates, and there is produced at the output of said pair of switch tubes a rectangular gate centered about said point of equal amplitudes of said sloping gates, the duration of said rectangular gate being controlled by the bias of the second of said pair of amplifier tubes.

2. An apparatus for generating sloping and rectangular gates comprising, a source of linear saw-tooth voltage signals, an adjustable control voltage source, a cathode coupled amplifier including first and second electron tubes having a common cathode impedance and individual anode impedances, each of said electron tubes including a control grid, means for connecting said control grid of said second electron tube to a point of fixed bias potential, means coupling said source of saw-tooth signals and said control voltage source to said grid of said first electron tube whereby the signals appearing across the anode impedances of said first and second electron tubes, respectively, are a pair of sloping gates, one of said gates increasing in amplitude as the other of said gates decreases in amplitude in predetermined phase relation to said saw-tooth voltage signals and whereby adjustment of said control voltage source symmetrically varies the initial value of said two gates with respect to a value intermediate the initial values of said sloping gates without altering the slope of said gates, third and fourth electron tubes having a common anode load impedance, each of said last-mentioned two tubes being connected to pass current therethrough when the potential on a grid thereof exceeds a preselected value lying between said initial values of said gates, means for coupling the signal appearing across the anode impedance of said first electron tube to the grid of said third electron tube and means for coupling the signal appearing across the anode impedance of said second electron tube to the grid of said fourth electron tube whereby a signal of predetermined time width is generated across said common anode impedance of said third and fourth electron tubes, said signal being movable in time position with respect to said saw-tooth signal by adjustment of said control voltage source.

3. An apparatus for generating sloping and rectangular gates comprising a source of linear saw-tooth voltage signals, a control voltage source, a cathode coupled amplifier including first and second electron tubes each having at least an anode, a cathode, and a control grid, a first load impedance connected to said anode of said first electron tube, a second load impedance connected to said anode of said second electron tube, a common cathode impedance connected to said cathode of said first and second electron tubes, and means biasing said control grid of said second electron tube to a preselected fixed potential, means coupling said source of saw-tooth signals and said control voltage source to said control grid of said first electron tube, a switch circuit comprising third and fourth electron tubes each having at least a cathode, an anode, and a control grid, a common anode load impedance connected to said anode of said third and fourth electron tubes, and means biasing said cathode of said third and fourth electron tubes at a preselected fixed potential, means coupling said anode of said first electron tube to said grid of said third electron tube, and means coupling said anode of said second electron tube to said grid of said fourth electron tube whereby, as said saw-tooth voltage and said control voltage are applied to said control grid of said first electron tube, there is produced at the anode of said first and second electron tubes a pair of sloping gates, one gate increasing in amplitude as the other gate decreases in amplitude, said control voltage determining the point, relative to said saw-tooth voltage, of equal amplitude of said pair of sloping gates and whereby there is produced at the anode of said third and fourth electron tubes a rectangular gate centered about said point of equal amplitudes of said sloping gates.

4. A circuit for generating a gate adjustable in time relative to a linear saw-tooth voltage comprising means responsive to said saw-tooth voltage for producing a pair of sloping gates, one of said pair increasing in amplitude as the other of said pair decreases, voltage operated switch means adapted to pass current when a potential applied thereto exceeds a predetermined value, said predetermined value being higher than the amplitude of said gates when the amplitude of one of said gates equals the amplitude of the other of said gates, an impedance and a source of energy connected in series with said switch means and means separately connecting said pair of gates to said switch means, whereby current flows through said impedance during a preselected time interval centered about the time when said gates are equal in amplitude.

5. A circuit for generating a gate adjustable in time relative to a linear saw-tooth voltage comprising means responsive to said saw-tooth voltage for producing a series of pairs of sloping gates in predetermined time relation to said saw-tooth voltage, one of said pair increasing in amplitude as the other of said pair decreases, switch means responsive to said pair of gates, said switch means being adapted to permit the flow of current therethrough whenever the amplitude of either of said gates exceeds a preselected value and to interrupt the flow of current therethrough whenever the amplitude of both of said gates is below said preselected value, said preselectd value being selected so that said decreasing gate reaches said value prior to the time said increasing gate reaches said value, means for generating a gate when said switch means interrupts current therethrough, and means for adjusting the initial values of said sloping gates whereby the time at which said gates arrive at said preselected value is variable in time with respect to said saw-tooth voltage.

6. A gate generator circuit comprising first and second electron tubes having a common anode load impedance, each of said electron tubes being adapted to pass current therethrough when the potential on a grid thereof exceeds a preselected value, means for generating a pair of sloping voltage gates, one of said gates increasing in amplitude as the other of said pair decreases in amplitude, said gates being so related that said decreasing gate reaches said preselected value prior to the time that said increasing gate reaches said value, means coupling said increasing gate to said grid of said first electron tube, and means coupling said decreasing gate to said grid of said second electron tube.

7. A gate generator circuit comprising first and second electron tubes having a common anode load impedance, each of said electron tubes being adapted to pass current therethrough when the potential on a grid thereof exceeds a preselected value, means for generating a pair of sloping voltage gates, one of said gates increasing in amplitude as the other of said pair decreases in amplitude, said gates being so related that said decreasing gate reaches said preselected value prior to the time that said increasing gate reaches said value, means coupling said increasing gate to said grid of said first electron tube, means coupling said decreasing gate to said grid of said second electron tube, and means for simultaneously varying with respect to the time of initiation of said pair of gates the times at which said two gates reach said preselected value whereby the time of occurrence of the gate generated by said circuit may be varied.

8. A gate generator circuit comprising first and second electron tubes having a common anode load impedance, each of said electron tubes being connected to pass current therethrough when the potential on a grid thereof exceeds a preselected value, means for generating a pair of sloping voltage gates, one of said gates increasing in amplitude as the other gate of said pair decreases in amplitude, said gates being so related that said decreasing gate reaches said preselected value prior to the time that said increasing gate reaches said value, means coupling said increasing gate to said control grid of said first electron tube, means coupling said decreasing gate to said grid of said second electron tube, and means associated with said sloping gate generating means for varying the initial values of said gates symmetrically with respect to said preselected value whereby said time position of the signal appearing across said common anode impedance may be varied without altering the time width of said signal.

ANDREW B. JACOBSEN.

REFERENCES CITED

The following references are of record in the file of this patent:

UNITED STATES PATENTS

| Number | Name | Date |
| --- | --- | --- |
| 2,207,048 | Campbell | July 9, 1940 |